United States Patent
Smidt et al.

(10) Patent No.: US 7,046,525 B2
(45) Date of Patent: May 16, 2006

(54) BIDIRECTIONAL FLYBACK SWITCH MODE POWER SUPPLY (SMPS)

(75) Inventors: Pieter Jan Mark Smidt, Eindhoven (NL); Hendrikus Johannes Jacobus Domensino, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 140 days.

(21) Appl. No.: 10/480,657

(22) PCT Filed: Jun. 20, 2002

(86) PCT No.: PCT/IB02/02364

§ 371 (c)(1),
(2), (4) Date: Dec. 12, 2003

(87) PCT Pub. No.: WO03/003552

PCT Pub. Date: Jan. 9, 2003

(65) Prior Publication Data

US 2004/0252530 A1    Dec. 16, 2004

(30) Foreign Application Priority Data

Jun. 28, 2001 (EP) .................... 01202501

(51) Int. Cl.
*H02M 3/335* (2006.01)
(52) U.S. Cl. .............. 363/21.12; 363/21.15; 363/20; 363/16
(58) Field of Classification Search ........... 363/21.12, 363/21.8, 21.16, 97, 131, 16, 20, 21.15; 323/271, 323/272, 222, 299
See application file for complete search history.

(56) References Cited

U.S. PATENT DOCUMENTS

| 3,986,097 | A | | 10/1976 | Woods ........................ 321/2 |
| 5,745,351 | A | * | 4/1998 | Taurand ..................... 363/20 |
| 5,768,118 | A | | 6/1998 | Faulk et al. ................. 363/72 |
| 6,084,784 | A | * | 7/2000 | Durbaum ................ 363/21.12 |
| 6,594,161 | B1 | | 7/2003 | Jansen et al. ............ 363/21.14 |

FOREIGN PATENT DOCUMENTS

| AT | 399432 B | 5/1995 |
| EP | 0013332 | 7/1980 |
| EP | 0336725 | 10/1989 |
| EP | 0551212 | 7/1993 |

* cited by examiner

Primary Examiner—Rajnikant B. Patel

(57) ABSTRACT

The present invention relates to a bidirectional flyback switch mode power supply (SMPS), such as a bidirectional flyback converter, and a method for operating it. The SMPS comprises a transformer having primary and secondary windings inductively coupled together, said primary winding being coupled to a voltage input of the converter and said secondary winding being coupled to a voltage output of the converter; a primary control unit comprising a primary switch arranged in series with the primary winding and a secondary control unit comprising a secondary switch arranged in series with the secondary winding. The primary control unit is adapted to compensate input voltage variations, and the secondary control unit is adapted to provide a controlled output power on the secondary side.

17 Claims, 4 Drawing Sheets

BIDIRECTIONAL FLYBACK SWITCH MODE POWER SUPPLY (SMPS)

The present invention relates to a bidirectional flyback converter.

The term switch mode converter is conventionally used in the art to describe a circuit which takes a DC or AC input and provides a single or multiple DC output, of the same or opposite polarity and lower or higher voltage. The term Switch Mode Power Supply (SMPS) is a common denomination to describe switch mode regulators and converters. A flyback SMPS circuit transfers energy from an inductor to the output capacitor when a switching element (e.g. a transistor) on the primary side is switched off, whereas a feed-forward SMPS circuit will supply energy to the output capacitor when the switching element is switched on. The principle power train structure of the bidirectional flyback has been known for a long time, and is e.g. described in U.S. Pat. No. 3,986,097 and EP 0013332.

A bidirectional or reciprocating converter is a converter in which energy is periodically fed back from the secondary side into the primary side. A conventional flyback switched mode power supply, on the other hand, transfers energy in only one direction, i.e. from the input circuit to the output circuit. Such a bidirectional converter is e.g. known from U.S. Pat. No. 5,768,118. The reciprocating converter uses a secondary switch (in parallel with the secondary rectifier) to allow the secondary current to cross zero and change sign to a negative value as it ramps down. When the switch of the secondary side opens, a negative current appears on the primary winding, and this current reduces the voltage on the switch of the primary side. After the voltage on the switch of the primary side has been reduced to an acceptable minimum level, the switch of the primary side is closed, and the input voltage causes the primary current to resume ramping up.

Accordingly, in a flyback switched mode power converter, the AC wall voltage is filtered and rectified to produce an unregulated DC input voltage. This unregulated DC input voltage is then provided to an input circuit which is connected to the primary winding of a power transformer. An output circuit is connected to the secondary winding of the power transformer, whereby the voltage at the output of the output circuit develops the appropriate DC voltage or DC current levels for an electronic device. The compact size and high efficiency of switched mode power converters are very advantageous in electronic equipment, such as laptop computers, for charging batteries, etc. The different mains voltages in various countries can then suitably be used to operate the equipment without adaptation or change-over.

Nevertheless, the performance of the bidirectional flyback converters strongly depend on the way the active switches are controlled, and this has been a problem over the years. Attempts to solve this problem have been presented in EP 0336725 and EP 0551212.

Conventional flyback converters are affected by several drawbacks, such as:
high switching losses;
isolated feedback is necessary;
problems to regulate the converter under no-load conditions; and
bad efficiency due to losses in the output rectifier in case of low output voltages.

These problems are well-known in the art Individual solutions to the problems have been proposed (see the above-discussed references). Nevertheless, a solution is desirable that overcomes several, and preferably all of the above problems, and/or that solves the problems in a simpler and preferably more effective way.

It is therefore an object of the present invention to provide a bidirectional flyback converter, and a method for controlling same, which alleviates the above-discussed prior art problems.

This object is achieved by means of a converter and a method according to the appended claims.

The invention provides a method of operating a bidirectional flyback switch mode power supply (SMPS), comprising the steps of:

ramping up current in a first direction through a primary winding of a transformer at the primary side of the converter;

opening a primary switch which is in series with said primary winding, thereby driving current through a secondary winding of said transformer at a secondary side of the converter which is inductively coupled to said primary winding;

controlling a secondary switch which is in series with said secondary winding, to permit said secondary winding to pass current in a first direction, and, subsequently, to permit said current to pass through said secondary winding in a second direction which is opposite to said first direction, so as to ? drive current through said primary winding in a second direction which is opposite to said first direction;

wherein the secondary switch is further controlled in order to provide a controlled output power on the secondary side; and wherein the primary switch is further controlled in order to compensate input voltage variations.

The invention provides a new control mechanism for a bidirectional flyback, which alleviates the above-discussed disadvantages. Especially, the control mechanism allows a relatively small amount of the circulating energy that results in a good load efficiency of the converter parts ?. Even in a no-load situation, the power dissipation can be made small at a finite switching frequency.

The primary switch is further preferably controlled in order to minimize circulating power.

Preferably, the primary switch comprises a field-effect transistor (FET), preferably a MOSFET, wherein said switch is controlled so as to compensate input voltage variations by keeping the valley of the drain voltage at a relatively constant value.

This control can be exercised in a very simple manner and proved to be surprisingly effective. Specifically, this control could limit the circulating power in the converter in a very simple and cost-effective way.

Alternatively, the field-effect transistor (FET) is controlled to compensate input voltage variations by controlling the valley of the drain voltage in dependence on the input voltage.

This control can also be exercised in a simple manner and likewise proved to be very effective. Specifically, this control could provide an absolute minimization of the circulating power in the converter over the full input voltage range, as well as total control of the circulating power in the converter.

According to another aspect, the invention relates to a bidirectional flyback switch mode power supply (SMPS) comprising:

a transformer having primary and secondary windings inductively coupled together, said primary winding being coupled to a voltage input of the converter and said secondary winding being coupled to a voltage output of the converter;

a primary control unit comprising a primary switch arranged in series with the primary winding;

a secondary control unit comprising a secondary switch arranged in series with the secondary winding;

characterized in that the primary control unit is adapted to compensate input voltage variations, and in that the secondary control unit is adapted to provide a controlled output power on the secondary side.

The invention thus provides the same control mechanism as that discussed above, with the same advantages.

These and other aspects of the invention will be apparent from and elucidated with reference to the embodiment(s) described hereinafter.

IN THE DRAWINGS

The scope of the applicability of the present invention will become apparent from the detailed description given hereinafter. However, it should be understood that the detailed description and specific examples, indicating preferred embodiments of the invention, are given by way of illustration only, since, within the spirit and scope of the invention, various changes and modifications will become apparent to those skilled in the art.

Figure 1:
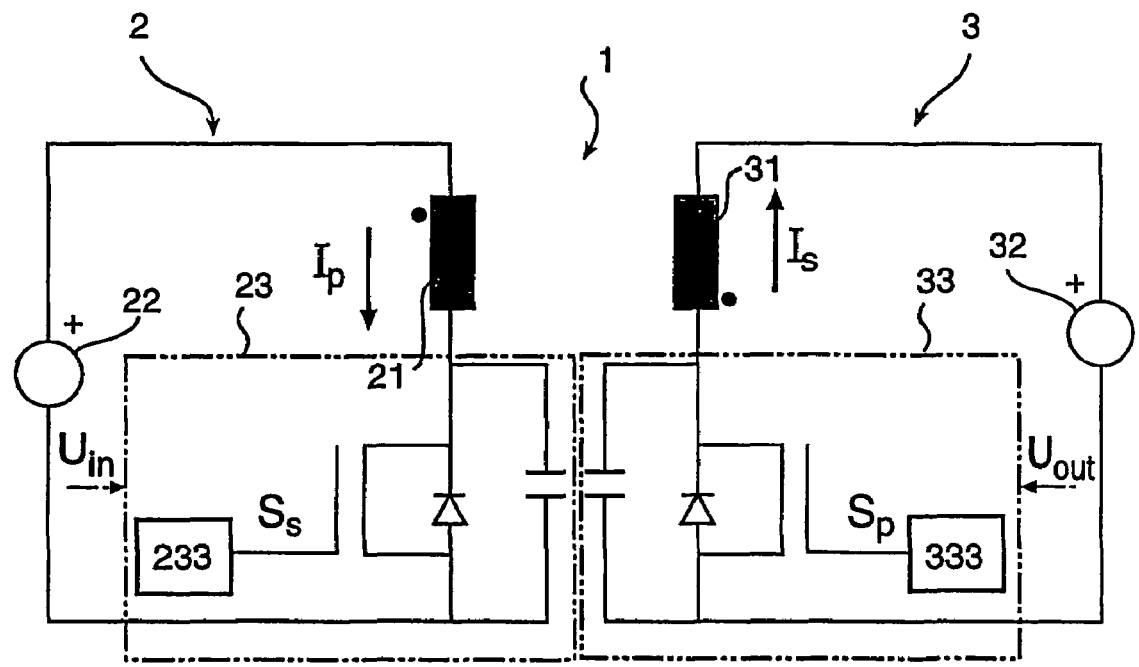
FIG. 1 is a schematic illustration of a general flyback converter according to an embodiment of the invention.

A bidirectional flyback switched mode converter according to an embodiment of the invention is schematically illustrated in FIG. 1. Said Figure shows is a power transformer 1 with a primary side 2 and a secondary side 3. The primary side has a primary winding comprising an inductor 21, and the secondary side has a secondary winding comprising an inductor 31. Furthermore, the primary side comprises an input circuit 22, where a DC input voltage, $U_{IN}$, is connected/applied ? to one end of the inductor 21. The other end of the inductor 21 is connected to a primary control unit The control unit preferably comprises a transistor, most preferably a metal-oxide-semiconductor field-effect transistor (MOSFET), such as an N-type depletion-mode MOSFET (NMOS), and means for controlling the transistor. The control unit will be discussed in more detail hereinbelow.

$U_{IN}$ could typically be provided by an AC wall voltage, which is passed through a rectifier. $U_{IN}$ typically ranges from 50 to 400 volts. $I_P$ is the current from inductor 21 having the orientation shown in FIG. 1.

In the secondary side, an output circuit 32 is provided to one end of the inductor 31, providing a DC output voltage, $U_{OUT}$. The other end of the inductor is connected to a secondary control unit 33. The secondary control unit preferably also comprises a transistor, most preferably a metal-oxide-semiconductor field-effect transistor (MOSFET), such as an N-type depletion-mode MOSFET (NMOS), and means for controlling the transistor.

Accordingly, the converter uses two controllers: one controller for the primary switch, and one controller for the secondary switch. Each controller controls the on-off switching of the associated switch.

Figure 2:
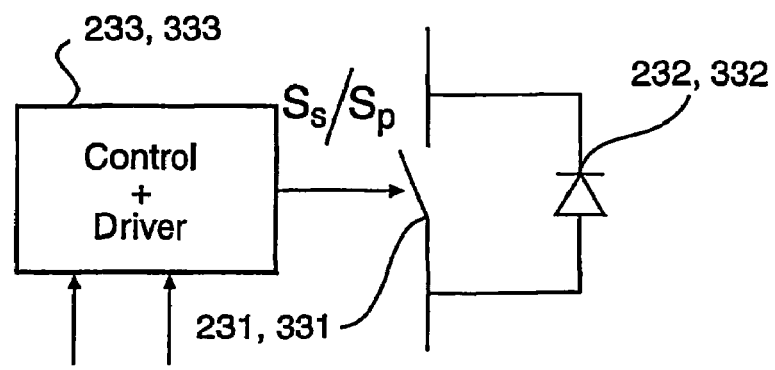
FIG. 2 is a schematic illustration of an embodiment of the control unit in the converter in FIG. 1.

An embodiment of the control units 23, 33 is illustrated in FIG. 2. Each of the control units preferably comprises a switch 231, 331 with an anti-parallel diode 232, 332 and control circuitry 233, 333 that can be either discrete or integrated. The control part exhibits input channels to receive information from the converter stage. The driver of the control part generates the drive signal for the active switch. The switch can be realized by means of any available switching device. Preferably a MOSFET is used, as this allows the internal body to represent the anti-parallel diode, thereby saving one additional component In this case, the drain of the MOSFET or any other transistor is connected to the inductor. Furthermore, a parasitic capacitance (not shown) could be arranged so as to lie between the drain of the transistor and the ground.

The switch is controlled from the control part by means of a control voltage, $S_P$ and $S_S$ for the primary and secondary side, respectively. If the switch is a transistor, the control voltage is connected/applied ? to the gate of the transistor.

Figure 3:
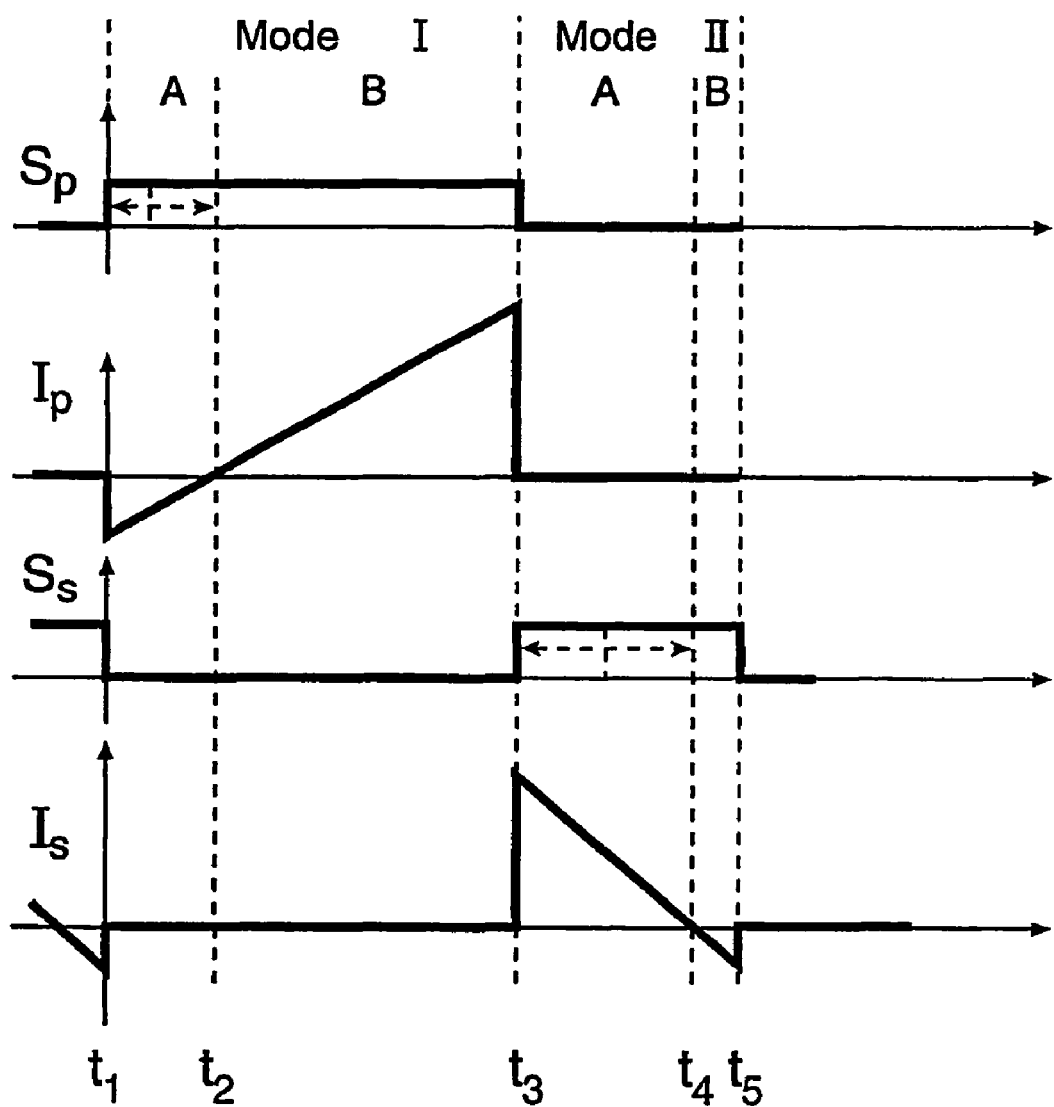
FIG. 3 is a diagram illustrating the waveforms and modes of the voltages and currents of the primary and secondary side, respectively, during operation of the bidirectional flyback converter in FIG. 1.

FIG. 3 illustrates the principles on which the behavior of the bidirectional flyback converter is based. In order to keep explanations simple, the flyback is assumed to be ideal. This means that no parasitic elements are included (leakage and stray inductances as well as parasitic capacitances). The dead time during which the soft transition occurs (zero voltage switching, ZVS) will also be neglected during the explanation.

There are two modes of operation: conduction mode I at the primary side and conduction mode II at the secondary side. Both modes can be divided into two sub-modes. During the first period A of each mode, energy is delivered to the relevant side, while during the second period B, energy that is to be delivered to the other side is stored in the transformer.

FIG. 3 illustrates the currents and voltages of the bidirectional energy flyback switched mode power supply. Next, a description is given of one switching cycle, from time $t_1$ until time $t_5$, as controlled by the above-discussed control units. At time $t_1$, the primary switch is turned on. During the time from $t_1$ until $t_3$, i.e. in mode I, $I_P$ ramps upward due to the DC voltage, $U_{IN}$, which is present across inductor 21. Furthermore, during the time from $t_1$ until $t_3$, there is no secondary current, $I_S$. This is attributable to the fact that the secondary switch is turned off.

Although $I_P$ is initially negative up to the time $t_2$, the positive primary current, $I_P$, stores energy in the magnetic field of transformer 1 during the time from $t_1$ until $t_3$.

After sufficient time has elapsed, $S_P$ turns off the switch in the primary control unit 23 at time $t_3$. After $S_P$ has turned off the primary switch, $S_S$ turns on the secondary switch in the secondary control unit 33 after a short delay not shown in FIG. 3. Once the primary switch has been turned off, a positive secondary current, $I_S$, is provided. During time $t_3$ to time $t_5$, i.e. during mode II, $I_S$ ramps downward, thereby transferring energy stored in the magnetic field of transformer 1 to the output, which completes the transfer of energy from the input circuit to the output circuit.

Once the energy stored in the magnetic field of transformer 1 has been transferred, some energy is transferred back to transformer 1. The energy transferred back is used to discharge capacitor 114 before transistor 110 is switched on. As shown in FIG. 3, from time $t_4$ until time $t_5$, $I_S$ is negative, thus causing energy to be stored in the magnetic field of transformer 1.

At time $t_5$, the secondary switch is turned off. Thus, there is no secondary current, and $I_S$ is made equal to zero from time $t_5$ until time $t_3$ on the next cycle. Subsequently, the primary switch is once again switched on, thereby starting another switching cycle. Primary current $I_P$, at time $t_5$, has an initial value which is negative.

During each sub-mode A, the current can flow either through a rectifier diode—in the case of a MOSFET the internal body can be used—or through the switch, if a bidirectional switch is used and activated. The switch can be switched on during the complete period A under zero voltage condition or at reduced switching losses.

As discussed above, the secondary current, $I_S$, is allowed to ramp down to negative currents before the switch of the secondary side opens. When the switch of the secondary side opens, a negative current appears on the primary winding, and this current reduces the voltage on the switch of the primary side. After the voltage on the switch of the primary side has been reduced to an acceptable minimum level, the switch of the primary side is closed, and the primary current begins to ramp up again.

According to the invention, the problems with the above-discussed prior art solutions are solved by an appropriate control of the active switches.

A dead time between the control signals for the two switches together with the correct direction of the transformer currents results in zero voltage switching or reduced switching losses. Thus, the switching losses are eliminated or at least reduced. This makes it possible to use a higher switching frequency and thus allows more efficient and/or smaller/cheaper designs.

The bidirectional flyback converter provides a power flow from the primary to the secondary side but also in the opposite direction, i.e. from the secondary to the primary side. Thus, the control at the secondary side can reflect excessive power back to the primary side. This makes it possible to regulate output voltage or output current at the secondary side. Thus, an isolating feedback path can be avoided. The main task of the primary-side control is to supply enough energy to the secondary side.

Under steady-state conditions, a certain minimum amount of energy is reflected back to the primary side. Under no-load conditions the secondary-side controller will reflect the complete energy transferred from the primary side, minus the energy dissipated during one cycle through the transformer. The energy transfer from and to the secondary side needs a certain time span. Thus, the converter is preferably regulated at a finite frequency.

It is also possible to close the primary switch in one of the later valleys of the switch voltage. In this way, efficiency can be further improved at lower loads.

Referring again to FIGS. 1 and 2, the input signals to the control unit at the secondary side are preferably the output voltage and/or the output current because these are easily accessible values. These values are compared with the corresponding reference values. The resulting error signal is used to set the amount of reflected output power. The amount of output power could be determined either by controlling the negative peak current or by controlling the forward conduction time of the secondary switch. The derivation of the control value from the error signal could be done by conventional techniques, such as an error amplifier with PI-characteristics, etc. The output current at the secondary side is substantially a DC current, and is measured after the output smoothing resistance. The secondary current, $I_S$, can be monitored by a current sensor, such as a resistor, connected in series with the secondary winding 31, or can be estimated by monitoring the elapsed time from time t3 when the secondary switch 331 is first turned on. Similarly, the output voltage could e.g. be detected by a voltmeter or the like.

One additional signal is preferably provided, indicating whether the diode is conducting. This signal allows to switch-on the active switch under zero voltage conditions. The signal can be derived either from the voltage across the parallel combination of active switch and anti-parallel diode or by the current through this combination. Thus, the signal can be derived by conventional methods. However, if the switch should be switched on at reduced switching losses, i.e. no real zero voltage condition, it is sufficient to monitor the voltage across the switch and switch it on when an acceptable level is reached.

The primary control part is preferably also provided with a signal indicating whether the corresponding anti-parallel diode is conducting or with a signal indicating the presence of a valley in the switch voltage. Such signals can be derived using conventional methods. The signals allows to switch-on the primary switch under zero voltage conditions or at reduced switching losses. In addition, the primary control should preferably be provided with a signal that ensures an energy transfer that is high enough for all load situations. Several control variables are further possible, e.g. fixed peak current, fixed switching frequency, fixed on-time, etc., as is known in the art. However, as will be discussed in the hereinafter with reference to FIGS. 4 and 5, this approach is not useful in applications that have to deal with a substantial input voltage variation.

Figure 4:
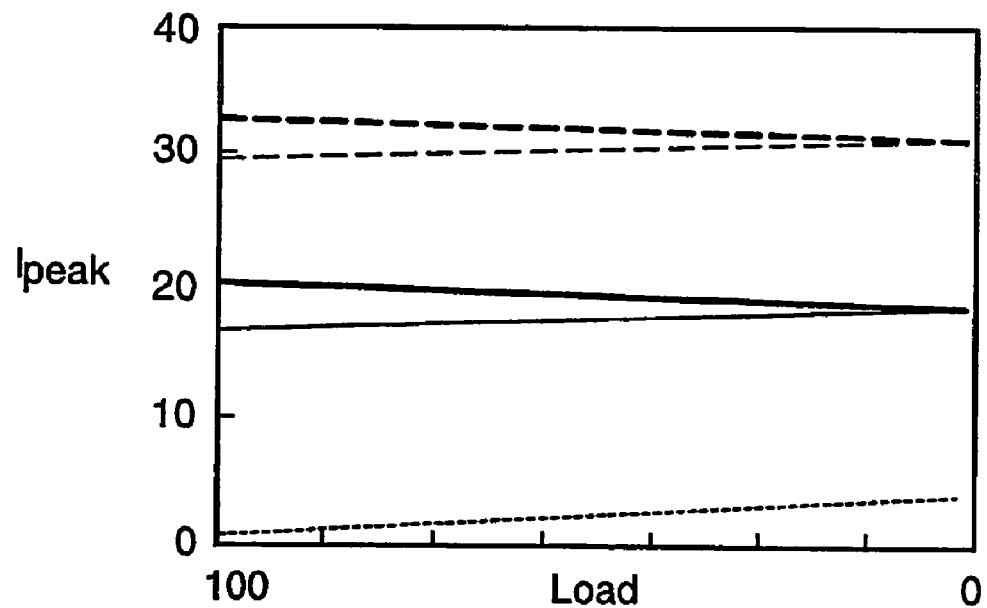
FIG. 4 illustrates primary-side peak currents for conventional bidirectional flyback converters.
Figure 5:
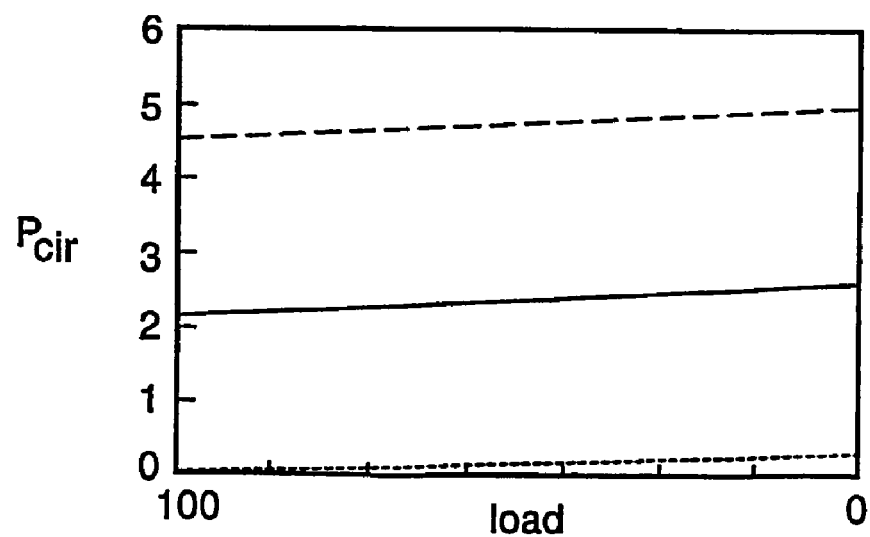
FIG. 5 illustrates the circulating energy in conventional bidirectional flyback converters.

At present, nearly all applications using AC-DC conversion have to be designed for a universal mains input This results in an input voltage range of more or less 50–400 V for the flyback converter. Since the on-time solution has to be adapted to ensure a high enough energy transfer also for the lowest input values, extremely high currents result for the higher input values. FIG. 5 depicts this situation. The currents are normalized to the minimum absolute value of the negative peak current at the primary side. The negative current is necessary to obtain ZVS for the primary-side MOSFET. In FIG. 4, thick lines indicate positive peak values and thin lines indicate negative peak values, whereas dotted lines indicates minimum input voltage, solid lines indicate nominal input voltage and dashed lines indicates maximum input voltage. As is clearly seen in FIG. 4, in the worst case, the normalized negative peak current is nearly 30 times higher, leading to high current ratings, rms losses and to a large amount of circulating energy.

The corresponding amount of circulating energy, normalized to the maximum output power, in dependence on the load for different input voltages is shown in FIG. 5. In FIG. 5, dotted lines indicate the circulating energy for minimum input voltages, solid lines indicate the circulating energy for nominal input voltages and dashed lines indicate the circulating energy for maximum input voltages. While for low input voltages the amount of circulating energy is relatively small for all load situations, the amount of circulating energy ramps up to five times (in this example) the maximum output power. This clearly demonstrates the drawback of such a control system. In the case of wide input ranges, this method is not acceptable.

Figure 6:
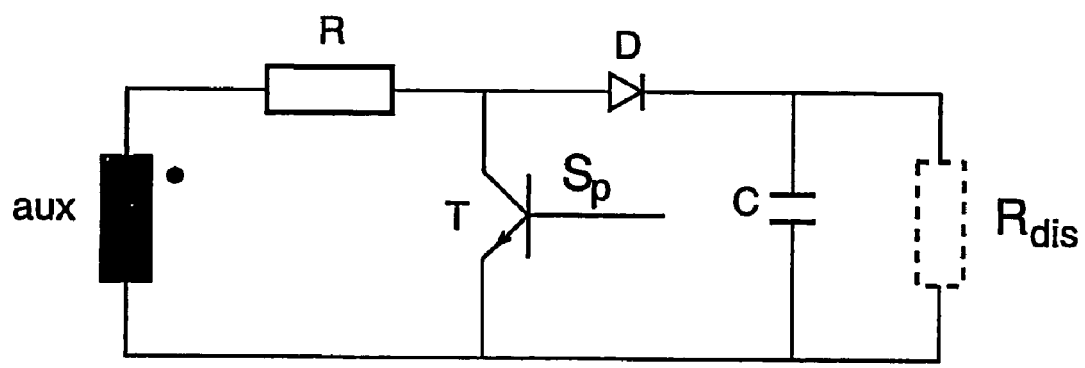
FIG. 6 illustrates a simple detection circuit to be used in an embodiment of the invention.

According to the invention, said drawback is obviated by controlling the control units so as to tackle the input voltage variation at the primary side, while load regulation/variation ? is tackled at the secondary side. If the primary-side control unit comprises a MOSFET, the MOSFET could, to this end, be controlled in such a way that the valley of the drain voltage is kept at a constant value. Alternatively, the valley of the drain voltage could be controlled in dependence on the input voltage. The input voltage, $V_{IN}$, could, to this end, be monitored through a voltmeter or an auxiliary winding of transformer 1. The drain voltage valley could be detected with a conventional sample-and-hold technique or with a simple detection circuit comprising the auxiliary winding (aux), as illustrated in FIG. 6. In this case, the valley on the drain is a peak. By closing the transistor T when $S_S$ is high, detection of the wrong value is precluded. The diode D and the capacitor C form a simple peak rectifier. A resistance $R_{dis}$ can be added for improved dynamic behavior of the converter.

Once the valley value (i.e. the peak value in the above discussed circuit) is known, a simple PI error amplifier could be used for controlling the device accordingly.

In order to further optimize the system, the setpoint (i.e. the desired value) of the valley could be made a function of $V_i$. For example, $V_{set}$ could be proportional to $V_i$.

A converter as described above tackles the input voltage variation at the primary side while load regulation is tackled at the secondary side. As a result, the amount of circulating energy in the converter is minimized to the level indicated by the dotted line in FIG. 5 for all input voltages. This leads to a much more efficient and cost-effective converter, due to the elimination of the isolated feedback, higher efficiency, lower electromagnetic interference (EMI), smaller size, etc.

The converter according to the invention could be used both for AC-DC and DC-DC power conversion. It is especially suitable for all applications in the lower power range, i.e. up to a few hundreds Watts.

The primary and secondary control units may operate independently of one another, or one controller may be dependent on the signals generated by the other controller. If the two controllers operate independently of one another, each controller must monitor the states of the power supply in order to determine the appropriate switching times. If the two controllers interact with each other, one controller operates a master controller, and one operates as a slave controller.

Furthermore, other variations and alternatives are possible as well. For example, as will be obvious to those of ordinary skill in the art, other circuit elements can be added to, or be used as substitutes in, the specific circuit embodiments discussed above, such as other types of switching means, other types of control units, etc. Furthermore, the invention may be used in a large range of different applications. Such modifications and other closely related modifications must be considered to be within the scope of the invention as defined by the appended claims.

The invention claimed is:

1. A method of operating a bidirectional flyback switch mode power supply (SMPS), comprising the steps of:
    (1) closing a primary switch when the voltage across the primary switch is substantially in a valley less than zero, thereby ramping up current in a first direction through a primary winding of a transformer at the primary side of the converter;
    (2) opening a primary switch which is in series with said primary winding, thereby driving current through a secondary winding of said transformer at a secondary side of the converter which is inductively coupled to said primary winding;
    (3) controlling a secondary switch which is in series with said secondary winding, to permit said secondary winding to pass current in a first direction, and, subsequently, to permit said current to pass through said secondary winding in a second direction which is opposite to said first direction, so as to drive current through said primary winding in a second direction which is opposite to said first direction;
    wherein the secondary switch is further controlled in order to provide a controlled output power on the secondary side; and
    wherein the primary switch is further controlled in order to compensate input voltage variations.

2. A method according to claim 1, wherein the primary switch is further controlled in order to minimize circulating power.

3. A method according to claim 1, wherein the primary switch comprises a field-effect transistor (FET), preferably a MOSFET, wherein said switch is controlled so as to compensate input voltage variations by keeping the valley of the drain voltage at a relatively constant value.

4. A method according to claim 1, wherein the primary switch comprises a field-effect transistor (FET), preferably a MOSFET, wherein said switch is controlled so as to compensate input voltage variations by controlling the valley of the drain voltage in dependence on the input voltage.

5. A method according to claim 4, wherein the field-effect transistor is feed-forward controlled.

6. A method according to claim 1, wherein the primary and secondary switches are further controlled to provide a dead time between deactivation of one and activation of the other.

7. A method according to claim 1, wherein the control of the secondary switch is based on input signals representative of the output voltage and/or the output current.

8. A method according to claim 1, wherein the control of the primary switch is based on an input signal representative of the input voltage.

9. A bidirectional flyback switch mode power supply (SMPS) comprising:
    a transformer having primary and secondary windings inductively coupled together, said primary winding being coupled to a voltage input of the converter and said secondary winding being coupled to a voltage output of the converter;
    a primary control unit comprising a primary switch arranged in series with the primary winding, the primary switch being closed in each cycle of operation when the voltage across the primary switch is substantially in a valley less than zero;
    a secondary control unit comprising a secondary switch arranged in series with the secondary winding; characterized in that the primary control unit is adapted to compensate input voltage variations, and in that the secondary control unit is adapted to provide a controlled output power on the secondary side.

10. A power supply according to claim 9, wherein the primary control unit comprises a field-effect transistor (FET), preferably a MOSFET, having a conduction channel and a control terminal.

11. A power supply according to claim 10, wherein the primary control unit is adapted to control the field-effect transistors (FET) so as to compensate input voltage variations by keeping the valley of the drain voltage at a relatively constant value.

12. A power supply according to claim 10, wherein the primary control unit is adapted to control the field-effect transistors (FET) so as to compensate input voltage variations by controlling the valley of the drain voltage in dependence on the input voltage.

13. A power supply according to claim 9, wherein the power supply is a switch mode power converter.

14. A power supply according to claim 9, wherein the secondary control unit is provided with input signals representative of the output voltage and/or the output current.

15. A power supply according to claim 14, wherein the secondary control unit further comprises a diode, and wherein the secondary control unit is further provided with an input signal indicating whether the diode is conducting.

16. A power supply according to claim 9, wherein the primary control unit is provided with an input signals representative of the input voltage.

17. A power supply according to claim 9, wherein the primary control unit further comprises a diode, and wherein the primary control unit is provided with an input signal indicating whether the diode is conducting.

* * * * *